A. C. MACARTNEY.
TEAT CUP FOR MILKING MACHINES.
APPLICATION FILED FEB. 20, 1917.
1,246,292.
Patented Nov. 13, 1917.
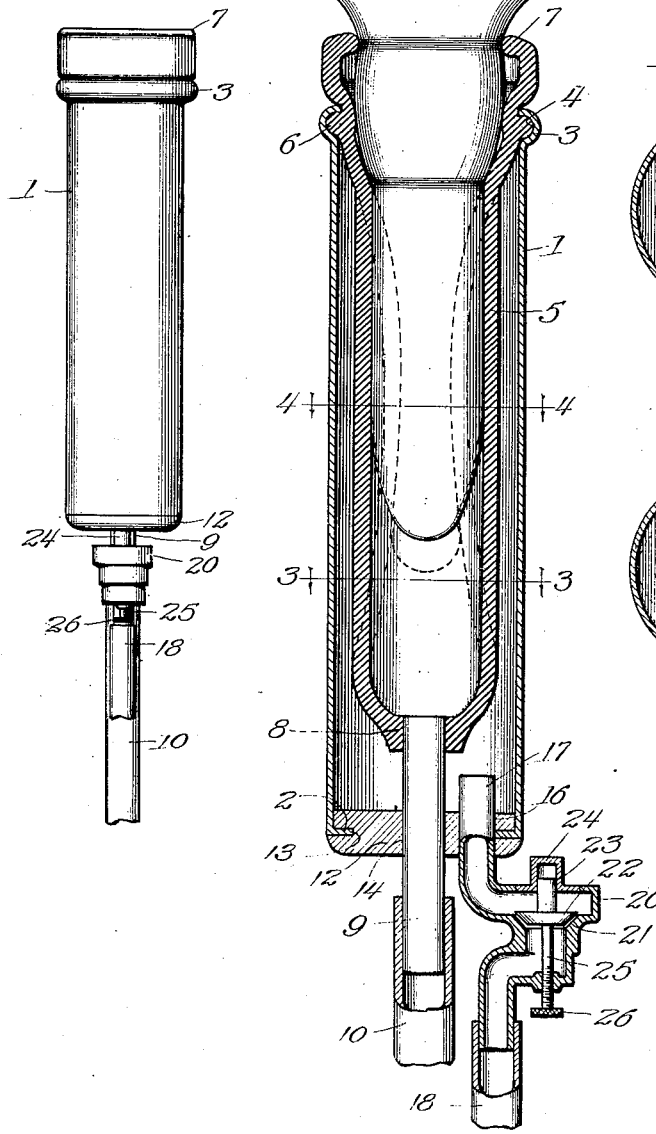
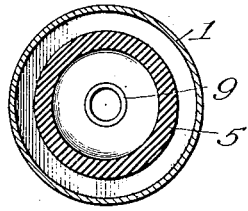
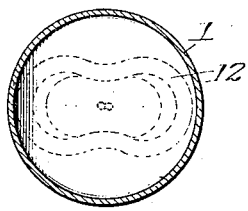

UNITED STATES PATENT OFFICE.

ARTHUR C. MACARTNEY, OF CHICAGO, ILLINOIS, ASSIGNOR TO PINE TREE MILKING MACHINE COMPANY, OF CHICAGO, ILLINOIS, A CORPORATION OF ILLINOIS.

TEAT-CUP FOR MILKING-MACHINES.

1,246,292.     Specification of Letters Patent.     Patented Nov. 13, 1917.

Application filed February 20, 1917. Serial No. 149,738.

*To all whom it may concern:*

Be it known that I, ARTHUR C. MACARTNEY, a subject of the King of Great Britain, residing at Chicago, Cook county, Illinois, have invented certain new and useful Improvements in Teat-Cups for Milking-Machines, of which the following is a specification.

My invention relates to teat cups for milking machines especially of the type having a rigid casing and a flexible lining or inflation which engages the teat and which is caused to pulsate or contract and expand. The teats of different animals vary greatly in diameter, and one of the principal objects of my invention is to produce a universal teat cup which may be used with equal effect upon teats of large and small diameter. Briefly, this is accomplished by employing a small expansible lining and providing means by which the degree of vacuum on the outside of the lining may, in a practical manner, be regulated with respect to the constant vacuum inside of the lining, thereby regulating the degree to which the lining will be expanded. Another object of the invention is to provide a convenient construction by which allowance can be made for the elongation of the lining as a result of wear and deterioration of the rubber or similar material of which it is composed. It is known to those familiar with teat cups that when a rubber lining is employed, it gradually lengthens. This is due to the natural loss of resilience due to constant expansion and contraction and to the action of the fat to which it is necessarily exposed. As a result of my invention this elongation is taken care of simply and effectually.

Another object is to provide simple, efficient and durable means for removably supporting the lining.

Other objects, including those relating to structural details will become apparent from the following description and claims.

I obtain my objects by the mechanism illustrated in the accompanying drawings, in which:

Figure 1 is a side elevation of my improved teat cup, the pipe connections being broken away.

Fig. 2 is a central longitudinal section with parts shown in full lines, the same being shown as engaged with a teat, the lining or inflation being shown in its normal position by full lines and in its collapsed or contracted position by dotted lines.

Fig. 3 is a cross section on line 3—3 of Fig. 2, the lining or inflation being in its normal position.

Fig. 4 is a cross section on line 4—4 of Fig. 2, the lining or inflation being shown in collapsed condition by dotted lines.

In the drawing similar reference characters refer to similar parts throughout the several views, and the sectional views are taken looking in the direction of the arrows at the ends of the section lines.

Referring to the drawings, the casing 1 is formed of metal or other relatively rigid material and is preferably formed of tubing. It has an inturned flange 2 at its bottom and a bead 3 at its top forming an internal annular groove 4. The lining or inflation 5 is formed of resilient material, preferably rubber, and is provided with a circumferential rib or bead 6 near its upper end adapted to seat in the groove 4. It possesses sufficient stiffness to securely hold the bead in the groove 4 and thus support the lining. The lining may be readily removed, however, by simply collapsing it at the upper end and disengaging the bead from the groove. The lining extends above the bead 6 and at the upper end has an inwardly extending annular flange 7, which embraces the teat at the root as shown in Fig. 2.

When my invention is availed of to its full extent, a lining of comparatively small diameter is used,—one that will fit a small teat when the lining is in normal, unstretched condition. When it is to be used on large teats, it is expanded by producing a greater vacuum outside the lining than inside, in the manner presently to be described. The lining has an opening 8 in the bottom to receive the nipple 9. This nipple is connected to a tube 10 which exerts a constant vacuum and conveys the milk to the milk receptacle. The bottom 12 of the casing has a groove 13 which receives the annular flange 2 and holds the bottom in position. By forming this bottom disk wholly or in part of rubber or similar material, it may be conveniently and readily placed or removed and requires no fastening device other than the flange and groove. Positive fastening devices may, however, be employed. Said bottom disk has an opening 14 through which the nipple 9 passes. In the form shown the nipple is vertically slidable in the bottom, being frictionally held in any position to which it may be adjusted. As a result, it is a simple matter, when the lining lengthens, to lower the nipple and take up the slack.

The bottom disk also has an opening 16 for receiving the nipple 17 which communicates with the space between the lining and the casing. Tube 18 communicates with the nipple 17 and with a pulsator which produces a pulsating vacuum within the casing. Some pulsators, after the maximum vacuum has been reached, admit air at atmospheric pressure while others introduce air under positive pressure higher than atmospheric pressure. When used under the conditions contemplated by one aspect of my invention, means will be employed capable of producing a higher vacuum in the space outside of the lining than it produces in the space within the lining. For reasons presently to be explained, it is desirable, in order to obtain the full benefits of my invention, to provide means whereby the intensity of the vacuum outside the lining may be readily controlled, and it is also desirable to provide means whereby air, either atmospheric or under pressure, will have a more ready ingress than egress to this space. In the embodiment shown, I form a valve casing 20 in the duct 17, 18, said casing having a seat 21 for the check or reducing valve 22. This valve is guided vertically by a stem 23 which slides in the cylindrical dome 24 of the casing. An adjustable stop 25 provided preferably with a knurled head 26 screws up through the bottom of the casing and limits the extent to which the valve may approach its seat. The valve seat faces inward so that the valve is free to rise when air is rushing toward the space between the lining and the casing. When the air is being exhausted therefrom, however, it will assist gravity in urging the valve toward its seat. The valve will then restrict the passage and consequently the intensity of the vacuum produced inside of the casing at each pulsation may be regulated by raising or lowering the stop 25.

In operation, let it be assumed that a small rubber lining is in place within the casing and that the pulsator first exhausts air from the space between the lining and casing and then admits air under atmospheric pressure. Let it be assumed also that the maximum vacuum in the tube 18 will be greater than the constant vacuum in the tube 10. If, now, it is desired to apply the teat cup to a teat of large diameter, the operator will screw the stop 25 upward a considerable distance so as to afford a full free opening for the air to flow from the space between the lining and the casing. This will produce a greater vacuum in said space than exists within the lining and hence the lining will, at each pulsation, expand and permit the lining to accommodate the large sized teats. But if a teat of small diameter is to be milked, the operator lowers the stop and restricts the opening. This operates to reduce the intensity of the maximum vacuum in the space between the lining and the casing and hence will reduce the degree to which the lining will expand. But it is desirable that the pressure upon a small teat, when the lining is deflated, shall be approximately as great as the pressure upon a large teat, and this is rendered possible in my device by the presence of valve 22 which freely opens and lets the atmospheric air rush in as fast in the case of a small teat as in the case of a large one. It will thus be seen that by regulating the position of the stop 25, the extent to which the lining will expand may be regulated and hence the lining may be made to accommodate itself to teats of various sizes.

It will be understood that the design of the parts may be somewhat varied without departing from the spirit of the invention.

Having thus described my invention, what I claim as new and desire to secure by Letters Patent, is:

1. A teat cup having a casing, an expansible lining therein, a duct leading from inside the lining to a point outside the casing, a duct leading from outside the lining to a point outside the casing, and means in the latter duct for retarding the outflow and permitting free inflow of air.

2. A teat cup having a tubular casing, a resilient lining therein, a duct leading from the inside of the lining for producing a partial vacuum therein, a duct leading from the inside of the casing, external to the lining for producing a greater vacuum therein, and means in the latter duct for regulating the amount to which the external vacuum shall exceed the internal to thereby regulate the size to which the lining shall expand.

3. A teat cup having a casing, a diametrically expansible lining therein, a vacuum duct leading from inside the lining to a point outside the casing for creating a partial vacuum within the lining, a high vacuum duct leading to the outside of the casing from a point between the casing and the lining for creating a greater vacuum between the lining and the casing, and thereby causing the lining to expand, and a reducing valve in the last mentioned duct for regulating the degree of vacuum created within the casing outside of the lining to thereby control the size to which the lining shall expand.

4. A teat cup having a casing, a resilient lining supported from the upper end thereof, the lower end terminating above the lower end of the casing, means for creating a partial vacuum in the space between the casing and the lining, and a duct extending from the lower end of the lining out through the bottom of the casing, the effective length of the duct within the casing being variable.

5. A teat cup having a casing, a depending resilient lining within said casing terminating short of the bottom thereof, a suction tube leading outward from the space between the lining and the casing, a second suction tube leading out through the bottom of the casing from the inside of the lining, and means whereby the length of the last mentioned suction tube between the bottom of the lining and the bottom of the casing may be shortened to compensate for the increased length of the lining due to deterioration.

6. A teat cup having a casing, a resilient lining suspended at its upper end from the casing and extending down to a point above the bottom of the casing, a vacuum duct leading from the space between the casing and the lining, and a tube leading from the inside of the lining out through the bottom of the casing, said tube being vertically adjustable with reference to the bottom of the casing to thereby compensate for the permanent stretching and elongation of the lining.

7. A teat cup having a tubular casing, a flexible lining supported therein, a removable bottom for said casing, and two ducts supported by said bottom, one of said ducts leading from the inside of the lining and the other leading from the space between the lining and the casing.

8. A teat cup having a tubular casing, a flexible lining suspended therein from the top thereof, a removable bottom for said casing, and two ducts leading through the bottom, one communicating with the inside of the lining and the other communicating with the space between the lining and the casing, the bottom being disk-like and somewhat flexible, and the casing and bottom having interfitting, annular portions, whereby the bottom is removably held to the casing.

9. A teat cup having a tubular casing, an expansible lining therein, a milk duct leading out from the inside of the lining, said milk duct having a vacuum therein, a vacuum duct leading to the space between the lining and the casing, said vacuum duct having a pulsating vacuum therein, the maximum tension whereof is greater than the tension of the vacuum in the milk duct, and a check valve in the vacuum duct, said check valve opening freely inward to admit air to the space between the lining and the casing and retard the flow in the opposite direction.

10. A teat cup having a tubular casing, an expansible lining therein, a milk duct leading out from the inside of the lining, said milk duct having a vacuum therein, a vacuum duct leading to the space between the lining and the casing, said vacuum duct having a pulsating vacuum therein, the maximum tension whereof is greater than the tension of the vacuum in the milk duct, a check valve in the vacuum duct opening freely inward, and an adjustable stop for limiting the extent to which the check valve may close the passage through the duct.

11. A teat cup having a tubular casing, an expansible lining therein of small diameter for accommodating teats of small diameter, a milk duct leading out from the inside of the lining, said milk duct being under constant vacuum, a vacuum duct communicating with the space between the lining and the casing, said vacuum duct having a pulsating vacuum, the maximum intensity whereof is greater than the vacuum in the milk duct, a valve casing in said vacuum duct, said casing having a valve seat facing inward toward the space between the lining and the casing, a valve in said casing coöperating with said seat, and means for limiting the movement of said valve.

12. A teat cup having a tubular casing, an expansible lining therein of small diameter for accommodating teats of small diameter, a milk duct leading out from the inside of the lining, said milk duct being under constant vacuum, a vacuum duct communicating with the space between the lining and the casing, said vacuum duct having a pulsating vacuum, the maximum intensity whereof is greater than the vacuum in the milk duct, a valve casing in said vacuum duct, said casing having a valve seat facing inward toward the space between the lining and the casing, a valve in said casing coöperating with said seat, and a stop separate from said valve and adjustably mounted in the casing for preventing the valve from completely reaching its seat.

In witness whereof, I have hereunto set my hand and seal in the presence of two witnesses.

ARTHUR C. MACARTNEY. [L. S.]

Witnesses:
 HOWARD M. COX,
 M. S. ROSENZWEIG.